United States Patent
Blanc et al.

(10) Patent No.: US 10,441,050 B2
(45) Date of Patent: Oct. 15, 2019

(54) HAND HELD APPLIANCE

(71) Applicant: Dyson Technology Limited, Wiltshire (GB)

(72) Inventors: Jean-Baptiste Jerome Blanc, Bath (GB); Craig Douglas, Swindon (GB); Antoine Francois Atkinson, Swindon (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 344 days.

(21) Appl. No.: 15/297,951

(22) Filed: Oct. 19, 2016

(65) Prior Publication Data

US 2017/0112258 A1 Apr. 27, 2017

(30) Foreign Application Priority Data

Oct. 21, 2015 (GB) .................................. 1518631.5

(51) Int. Cl.
| | |
|---|---|
| *F26B 11/02* | (2006.01) |
| *A45D 20/12* | (2006.01) |
| *F24H 3/04* | (2006.01) |
| *H02K 5/24* | (2006.01) |
| *A45D 20/10* | (2006.01) |

(52) U.S. Cl.
CPC .............. *A45D 20/12* (2013.01); *A45D 20/10* (2013.01); *F24H 3/0423* (2013.01); *H02K 5/24* (2013.01)

(58) Field of Classification Search
CPC . H02K 5/24; H02K 5/26; A45D 20/10; A45D 20/12
USPC ........ 34/121, 239, 242; 248/605, 606, 205.1
See application file for complete search history.

(56) References Cited

U.S. PATENT DOCUMENTS

| | | | |
|---|---|---|---|
| 578,798 | A | 3/1897 | Wheelwright et al. |
| 2,687,137 | A | 8/1954 | Kramer et al. |
| 3,094,606 | A | 6/1963 | Ferris |
| 3,235,207 | A | 2/1966 | Church |
| 3,420,335 | A | 1/1969 | Dochterman |

(Continued)

FOREIGN PATENT DOCUMENTS

| | | |
|---|---|---|
| CN | 201142607 | 10/2008 |
| CN | 201956782 | 8/2011 |

(Continued)

OTHER PUBLICATIONS

Search Report dated Mar. 22, 2016, directed to GB Application No. 1518631.5; 1 page.

(Continued)

*Primary Examiner* — John P McCormack
(74) *Attorney, Agent, or Firm* — Morrison & Foerster LLP

(57) ABSTRACT

A mount for an electric motor, the mount comprising a sleeve for receiving a motor, the sleeve having a longitudinal axis extending between a first end and a second end, wherein the first end comprises a plurality of plurality of projections and the plurality of projections extend along the longitudinal axis. The sleeve may receive the motor via the first end or the second end. The plurality of projections may be spaced around a circumference of the sleeve. The plurality of projections may comprise a pattern of substantially constant frequency around the sleeve. The plurality of projections may be substantially V-shaped with the point extending along the longitudinal axis from the first end of the sleeve.

19 Claims, 4 Drawing Sheets

(56) References Cited

U.S. PATENT DOCUMENTS

| | | | |
|---|---|---|---|
| 3,721,411 | A | 3/1973 | Cunningham |
| 4,300,280 | A | 11/1981 | Majthan et al. |
| 4,350,872 | A | 9/1982 | Meywald et al. |
| 4,767,914 | A | 8/1988 | Glucksman |
| 4,800,309 | A | 1/1989 | Lakin |
| 5,242,281 | A | 9/1993 | Hartley et al. |
| 5,406,154 | A | 4/1995 | Kawaguchi et al. |
| 5,546,678 | A | 8/1996 | Dhaemers |
| 5,713,139 | A | 2/1998 | Briggs |
| 5,784,798 | A | 7/1998 | Taylor |
| 5,875,562 | A | 3/1999 | Fogarty |
| 5,974,680 | A | 11/1999 | Anderson et al. |
| 6,021,993 | A | 2/2000 | Kirkwood |
| 6,717,299 | B2 | 4/2004 | Bacile et al. |
| 7,152,695 | B2 | 12/2006 | Happ et al. |
| 7,836,607 | B2 | 11/2010 | Kim |
| 9,057,560 | B2 | 6/2015 | Dyson et al. |
| 9,144,286 | B2 | 9/2015 | Courtney et al. |
| 9,173,468 | B2 | 11/2015 | Moloney et al. |
| 9,282,799 | B2 | 3/2016 | Courtney et al. |
| 9,282,800 | B2 | 3/2016 | Courtney et al. |
| 9,414,662 | B2 | 8/2016 | Moloney et al. |
| 9,420,864 | B2 | 8/2016 | Gammack et al. |
| 9,420,865 | B2 | 8/2016 | Gammack et al. |
| 9,512,959 | B2 | 12/2016 | Atkinson |
| 9,526,310 | B2 | 12/2016 | Courtney et al. |
| 2006/0075654 | A1 | 4/2006 | Lin |
| 2007/0068034 | A1 | 3/2007 | Kim |
| 2007/0080593 | A1 | 4/2007 | O'Donnell |
| 2010/0008655 | A1 | 1/2010 | Tackitt et al. |
| 2010/0064542 | A1 | 3/2010 | Mulvaney et al. |
| 2011/0309068 | A1 | 12/2011 | Chen |
| 2012/0104884 | A1* | 5/2012 | Wagner ............... H02K 1/32 310/54 |
| 2014/0035413 | A1* | 2/2014 | Cowdry ............... H02K 5/24 310/91 |
| 2014/0325789 | A1 | 11/2014 | Hill et al. |
| 2014/0328670 | A1 | 11/2014 | Lamb |
| 2015/0020401 | A1 | 1/2015 | Atkinson |
| 2015/0021314 | A1 | 1/2015 | Coulton et al. |
| 2016/0166367 | A1* | 6/2016 | Kleppen ............... H02K 7/145 310/38 |
| 2016/0206074 | A1 | 7/2016 | Douglas et al. |

FOREIGN PATENT DOCUMENTS

| | | |
|---|---|---|
| CN | 203896083 | 10/2014 |
| EP | 1 808 951 | 7/2007 |
| EP | 2 000 042 | 12/2008 |
| EP | 2 693 610 | 2/2014 |
| EP | 3 022 831 | 1/2015 |
| FR | 1.255.721 | 3/1961 |
| GB | 953057 | 3/1964 |
| GB | 2 034 560 | 6/1980 |
| GB | 2 295 056 | 5/1996 |
| GB | 2500798 | 10/2013 |
| GB | 2506654 | 4/2014 |
| GB | 2513661 | 11/2014 |
| GB | 2513662 | 11/2014 |
| GB | 2515812 | 1/2015 |
| GB | 2516311 | 1/2015 |
| GB | 2533324 | 6/2016 |
| GB | 2534176 | 7/2016 |
| JP | 40-36100 | 12/1965 |
| JP | 48-13744 | 4/1973 |
| JP | 50-152873 | 12/1975 |
| JP | 51-69711 | 6/1976 |
| JP | 54-84507 | 6/1979 |
| JP | 54-95813 | 7/1979 |
| JP | 64-83205 | 3/1989 |
| JP | 2012-45178 | 3/2012 |
| JP | 2016-135096 | 7/2016 |
| WO | WO-2015/008025 | 1/2015 |

OTHER PUBLICATIONS

Atkinson, U.S. Office Action dated Feb. 22, 2016, directed to U.S. Appl. No. 14/331,747; 8 pages.

International Search Report and Written Opinion dated Dec. 13, 2016, directed to International Application No. PCT/GB2016/053018; 12 pages.

Douglas et al., U.S. Office Action dated Apr. 6, 2017, directed to U.S. Appl. No. 14/995,848; 11 pages.

Douglas et al., U.S. Office Action dated Aug. 2, 2017, directed to U.S. Appl. No. 14/995,848; 11 pages.

Douglas et al., U.S. Office Action dated Dec. 28, 2017, directed to U.S. Appl. No. 14/995,848; 8 pages.

* cited by examiner

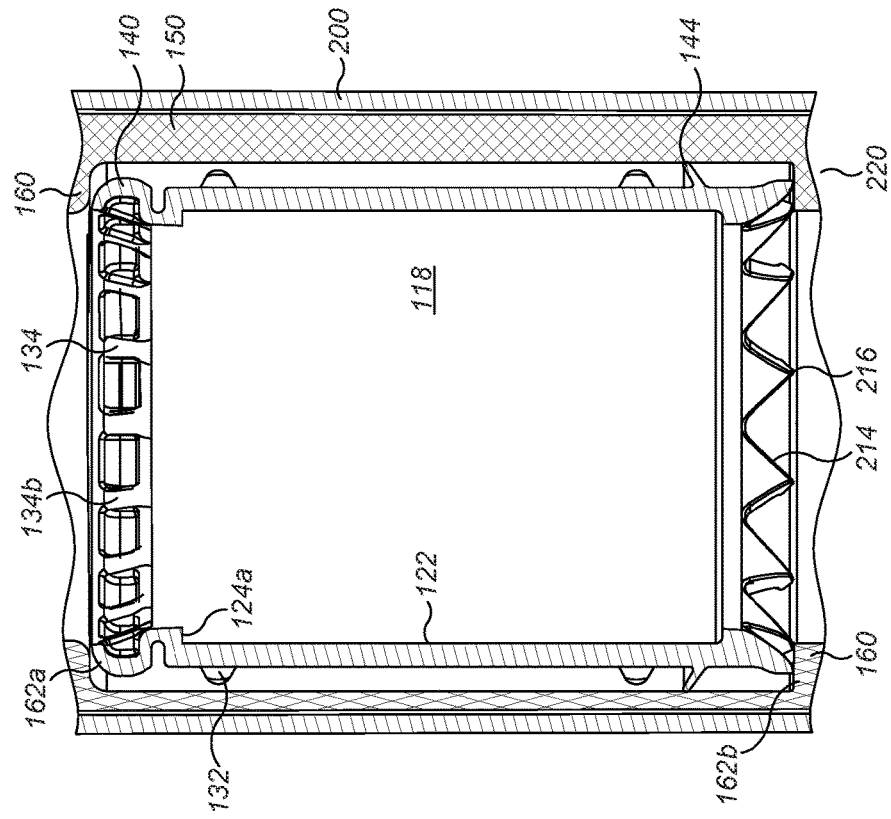
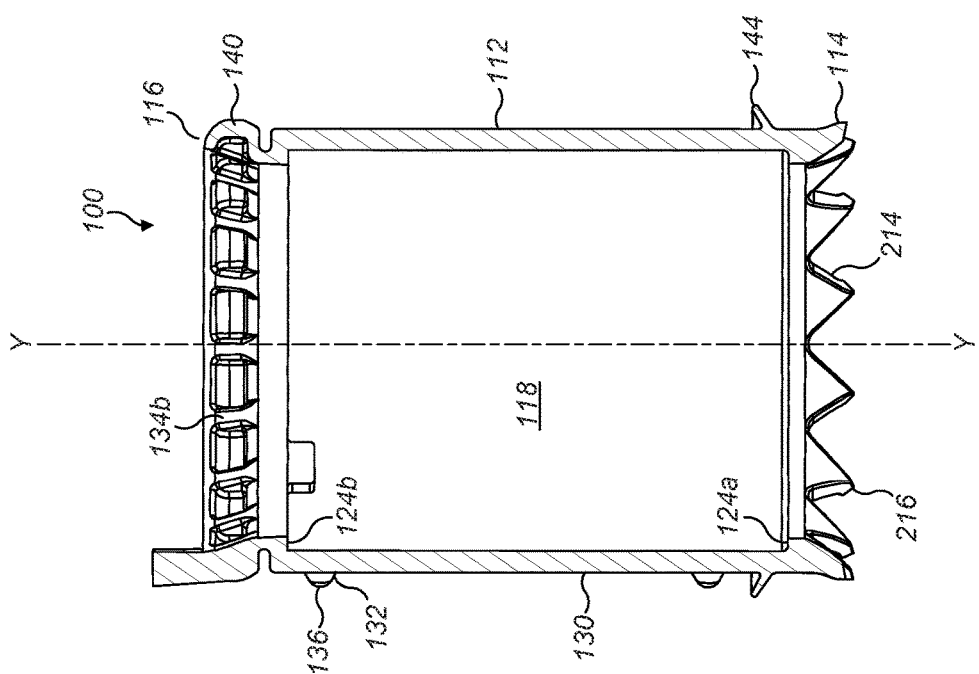

HAND HELD APPLIANCE

REFERENCE TO RELATED APPLICATIONS

This application claims the priority of United Kingdom Application No. 1518631.5, filed Oct. 21, 2015, the entire contents of which are incorporated herein by reference.

FIELD OF THE INVENTION

This invention relates to a mount for a motor, preferably an electric motor.

BACKGROUND OF THE INVENTION

Electric motors are becoming increasingly sophisticated and modern designs are capable of ever higher rotational speeds. One such design of electric motor is a brushless DC motor as used by the applicant in its range of handheld vacuum cleaners and which is capable of being driven at rotational speeds in the region of 100 Krpm.

The use of high speed motors in fluid-moving applications such as vacuum cleaners, fans and hair care appliances is technically attractive since a fan unit equipped with a physically small motor can nonetheless produce very high fluid flow rates.

However, particularly in the case of hand held appliances, the motor can form a significant part of the weight of the appliance and if that appliance is dropped the motor must be protected from damage and dislocation from its' housing.

SUMMARY OF THE INVENTION

According to one aspect, the invention provides a mount for an electric motor, the mount comprising a sleeve for receiving a motor, the sleeve having a longitudinal axis extending between a first end and a second end wherein the first end comprises a plurality of plurality of projections and the plurality of projections extend along the longitudinal axis.

The projections are provided to reduce the transmission of vibration/noise from a motor through the motor mount.

Preferably, the sleeve receives the motor via the first end or the second end. Preferably, wherein the plurality of projections are spaced around a circumference of the sleeve. It is preferred that the plurality of projections comprises a pattern of substantially constant frequency around the sleeve.

Preferably, the plurality of projections are substantially V-shaped with the point extending along the longitudinal axis from the first end of the sleeve.

Preferably, the first end is an upstream end of the mount.

It is preferred that a radial seal is provided and the radial seal extends around a circumference of the sleeve.

Preferably, the radial seal is a lip seal.

It is preferred that the wherein the radial seal is positioned near the first end of the sleeve. Preferably, the first end comprises a plurality of compression ribs.

Preferably, each of the plurality of elements and the or each bellow seal and the recess is a resilient support for a fan unit housed within the mount which is compressible.

Preferably, each one of the plurality of compression ribs is housed within one of the plurality of projections.

Preferably, wherein the second end comprises a plurality of compression ribs.

Preferably, the sleeve is formed of a polymeric material. Beneficial results are achieved when the motor mount is formed from a polymeric material, and the currently preferred material is polyurethane rubber. Preferably, the material used has a shore hardness of around 20.

Preferably, a second seal is provided near the second end of the sleeve. In a preferred embodiment the second seal is a bellow seal.

Preferably, the bellow seal houses a plurality of compression ribs.

Also disclosed is a hair care appliance comprising: a casing having a fluid inlet, a fluid outlet and an annular seat; a mount for an electric motor supported by the annular seat, the motor mount comprising: a sleeve for receiving a motor the sleeve having a longitudinal axis extending between a first end and a second end, wherein the first end comprises a plurality of projections, the plurality of projections extend along the longitudinal axis and the plurality of projections engages with the annular seat.

The projections and the motor are orientated such that when the motor is activated the resultant pressure presses down on the first end of the motor mount. Having projections reduces the contact surface of the motor mount with the casing thereby reducing the transmission of vibration/noise from the motor through the motor mount and to the casing.

Preferably, the appliance comprises a body which houses a heater and a handle which includes the casing.

It is preferred that the appliance comprises a fluid flow path extending from a fluid inlet into the casing to a fluid outlet in the body.

Preferably, the appliance comprises a motor located within the sleeve. In a preferred embodiment, the appliance includes a motor and impeller located within the sleeve. Alternatively, the impeller is located external to the sleeve.

It is preferred that a fluid flow path is provided between the fluid inlet and fluid outlet and through the sleeve. The annular seal of the motor mount seals the fluid flow path with respect to the casing preventing flow recirculating around the motor mount which reduces efficiency.

The casing may include an annular seat which preferably comprises a seal engaging surface, for example a flange, which preferably extends radially inwardly from an inner wall of the casing and generally perpendicular to the inner wall, and which is in sealing engagement with the annular seal.

BRIEF DESCRIPTION OF THE DRAWINGS

The invention will now be described, by way of example only, with reference to the accompanying drawings, in which:

FIG. 5 shows a cross section of the motor mount of FIG. 3; and

FIG. 6 shows a sectional view of the motor mount of FIG. 1 in a casing.

DETAILED DESCRIPTION OF THE INVENTION

Figure 1:
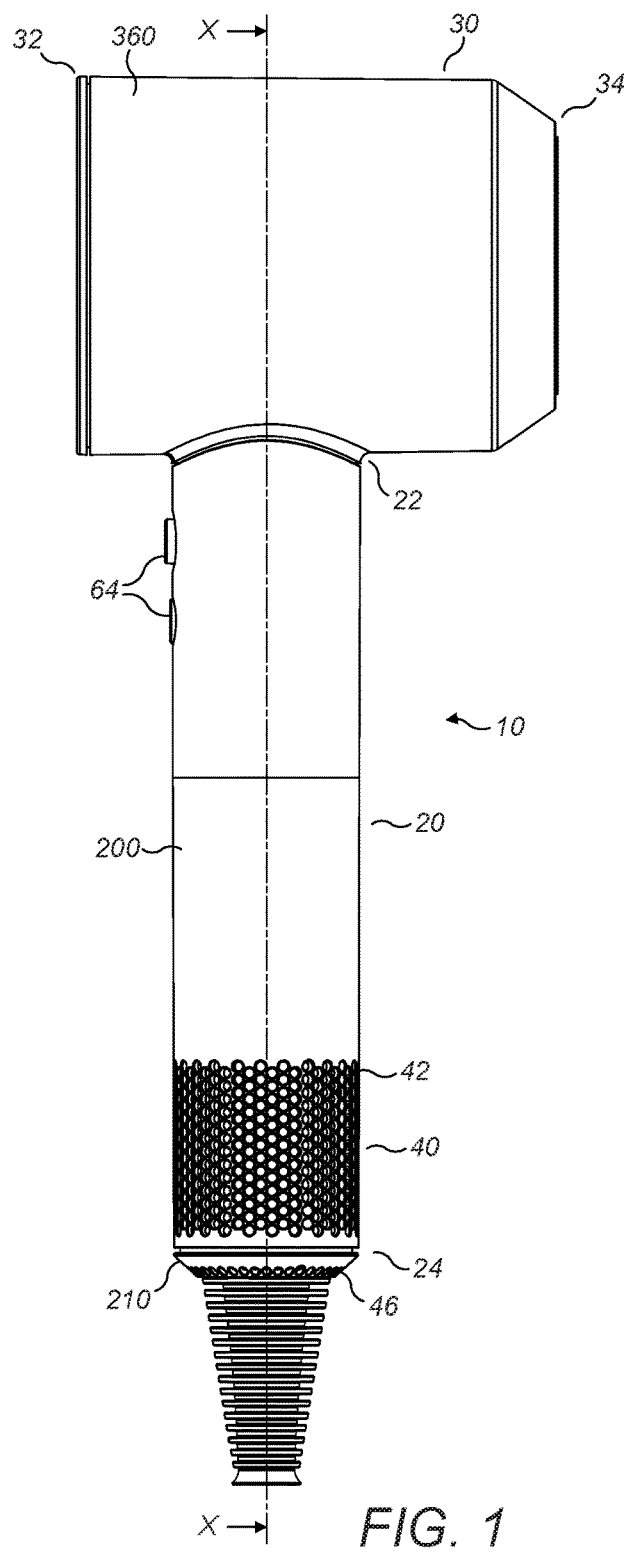
FIG. 1 shows a hairdryer in which a motor mount according to the invention may be used.
Figure 2:
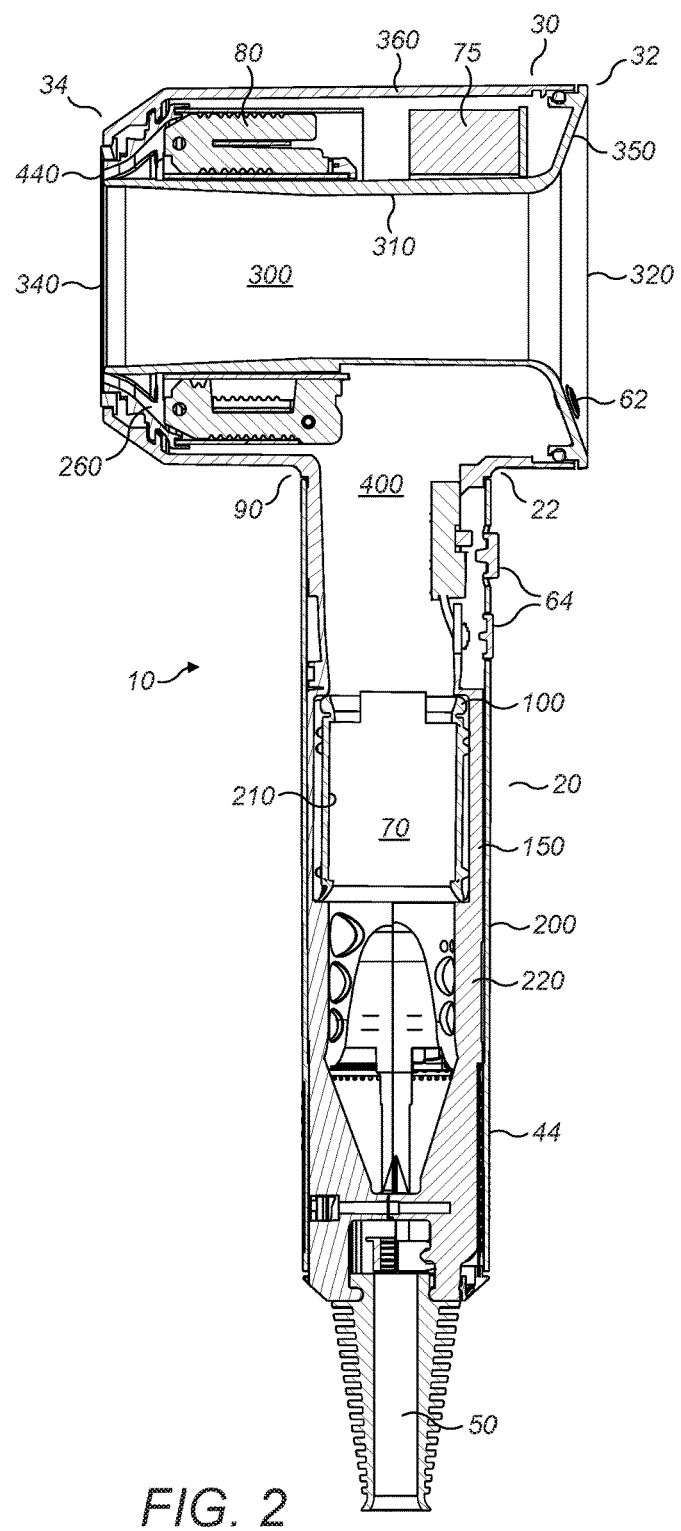
FIG. 2 shows a cross section through the hairdryer of FIG. 1.
Figure 4:
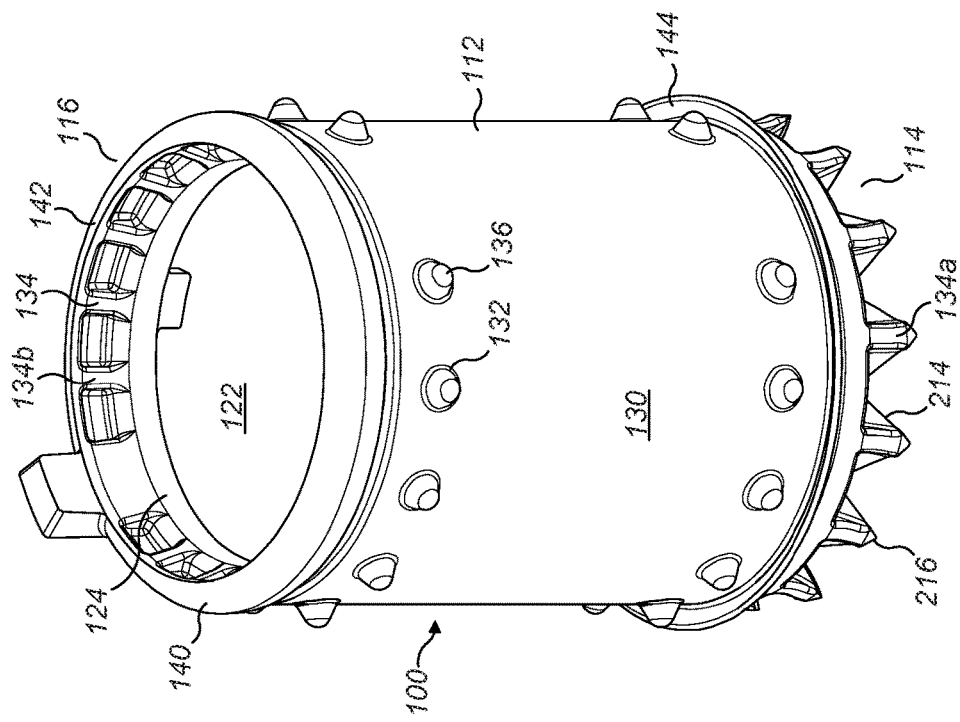
FIG. 4 shows an isometric view of the motor mount of FIG. 3.
Figure 3:
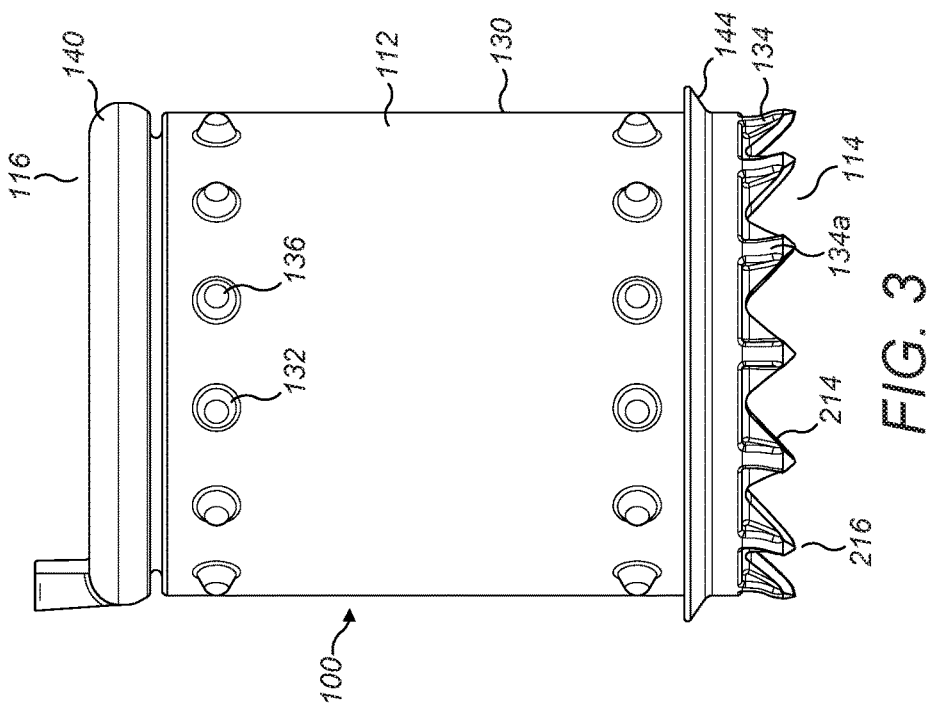
FIG. 3 shows a side view of a motor mount according to the invention.

FIGS. 1 and 2 show a hairdryer 10 with a handle 20 and a body 30. The handle has a first end 22 which is connected to the body 30 and a second end 24 distal from the body 30 and which includes a primary fluid inlet 40. Power is supplied to the hairdryer 10 via a cable 50. At a distal end of the cable 50 from the hairdryer 10 a plug (not shown) is provided, the plug may provide electrical connection to mains power or to a battery pack for example.

The handle 20 has an outer wall 200 which extends from the body 30 towards a distal end 24 of the handle. At the distal end 24 of the handle an end wall 210 extends across the outer wall 200. The cable 50 enters the hairdryer through this end wall 210. The primary fluid inlet 40 in the handle 20 includes first apertures that extend around and along 42 the outer wall 200 of the handle in a series of rows and/or columns that extend from the distal end 24 of the handle 20 and second apertures that extend across 46 and through the end wall 210 of the handle 20. The first and second apertures form an initial filter for the primary fluid inlet and help to prevent hair and other foreign objects from entering. Ideally, a second finer filter 44 is provided. The cable 50 is located approximately in the middle of the end wall 210 so extends from the centre of the handle 20. The handle 20 has a longitudinal axis X-X along which the outer wall 200 extends from the body 30 towards the distal end 24.

Upstream of the primary fluid inlet 40, a fan unit 70 is provided. The fan unit 70 includes a fan and a motor. The fan unit 70 is housed within a motor mount 100. The fan unit 70 draws fluid through the primary fluid inlet 40 towards the body 30 through a primary fluid flow path 400 that extends from the primary fluid inlet 40 and into the body 30 where the handle 20 and the body 30 are joined 90. Within the handle 20, the primary fluid flow path 400 extends within an inner wall 220 which includes a casing or housing 150 that defines the position of the motor mount 100 within the handle 20. The body 30 has a first end 32 and a second end 34, the primary fluid flow path 400 continues through the body 30 towards the second end 34 of the body, around a heater 80 and to a primary fluid outlet 440 where fluid that is drawn in by the fan unit exits the primary fluid flow path 400. The primary fluid flow path 400 is non linear and flows through the handle 20 in a first direction and through the body 30 in a second direction which is orthogonal to the first direction.

The body 30 includes an outer wall 360 and an inner duct 310. The primary fluid flow path 400 extends along the body from the junction 90 of the handle 20 and the body 30 between the outer wall 360 and the inner duct 310 towards the primary fluid outlet 440 at the second end 34 of the body 30.

An inner wall 260 extends within the outer wall 360. The inner wall 260 at least partially defines the primary fluid outlet 440 and extends from the second end 34 of the body 30 between the inner duct 310 and the outer wall 360.

Another fluid flow path is provided within the body; this flow is not directly processed by the fan unit or the heater but is drawn into the hairdryer by the action of the fan unit producing the primary flow through the hairdryer. This fluid flow is entrained into the hairdryer by the fluid flowing through the primary fluid flow path 400.

The first end 32 of the body includes a fluid inlet 320 and the second end 34 of the body includes a fluid outlet 340. Both the fluid inlet 320 and the fluid outlet 340 are at least partially defined by the inner duct 310 which is an inner wall of the body 30 and extends within and along the body. A fluid flow path 300 extends within the inner duct 310 from the fluid inlet 320 to the fluid outlet 340. At the first end 32 of the body 30, a side wall 350 extends between the outer wall 360 and the inner duct 310. This side wall 350 at least partially defines the fluid inlet 320. The primary fluid outlet 440 is annular and surrounds the fluid flow path.

A printed circuit board (PCB) 75 including the control electronics for the hairdryer is located in the body 30 near the side wall 350 and fluid inlet 320. The PCB 75 is ring shaped and extends round the inner duct 310 between the inner duct 310 and the outer wall 360. The PCB 75 is in fluid communication with the primary fluid flow path 400. The PCB 75 extends about the fluid flow path 300 and is isolated from the fluid flow path 300 by the inner duct 310.

The PCB 75 controls parameters such as the temperature of the heater 80 and the speed of rotation of the fan unit 70. Internal wiring (not shown) electrically connects the PCB 75 to the heater 80 and the fan unit 70 and the cable 50. Control buttons 62, 64 are provided and connected to the PCB 75 to enable a user to select from a range of temperature settings and flow rates for example.

In use, fluid is drawn into the primary fluid flow path 400 by the action of the fan unit 70, is optionally heated by the heater 80 and exits from the primary fluid outlet 440. This processed flow causes fluid to be entrained into the fluid flow path 300 at the fluid inlet 320. The fluid combines with the processed flow at the second end 34 of the body. In the example shown in FIG. 2, the processed flow exits the primary fluid outlet 440 and the hairdryer as an annular flow which surrounds the entrained flow that exits from the hairdryer via the fluid outlet 340. Thus fluid that is processed by the fan unit and heater is augmented by the entrained flow.

Referring now to FIGS. 2 to 6, the invention will now be described in detail. The motor mount 100 comprises a generally cylindrical sleeve 112 including first and second open ends 114, 116. The diameter of both the first open end 114 and second open end 116 is substantially the same as the diameter of the sleeve 112. The motor mount 100 and the sleeve 112 extends along a longitudinal axis Y-Y which is coincident with or parallel with the longitudinal axis X-X of the handle 20 of the hairdryer 10; the first end 114 and the second end 116 are in planes perpendicular to the longitudinal axis Y-Y of the sleeve 112.

The configuration of the sleeve 112 defines a chamber 118, into which is received a fan unit 70 comprising a motor frame 270 (FIG. 2), an electric motor and impeller. The fan unit 70 is received within the chamber 118 through an open end 114, 116 of the sleeve 112. Preferably the sleeve 112 is a flexible material such as a polymer so that the sleeve 112 can be pulled over the external surface of the fan unit 70, and stretched if necessary, so that an inner surface 122 of the sleeve 112 forms a tight fit around the fan unit 70, like a sock. A pair of annular internal flanges 124 extends radially inwards from the inner surface 122 of the sleeve. These flanges 124 define the extent of the chamber 118 and are adapted to retain the fan unit 70 in position with respect to the sleeve 112. Note that the inner surface 122 is smooth in this embodiment so as to conform closely to the cylindrical outer profile of the fan unit 70.

It will be appreciated that the fan unit 70 is shown schematically for simplicity and so as not to obfuscate the details of the motor mount 100. The fan unit is not central to the inventive concept and so will not be described in detail. In addition although in this embodiment the whole fan unit 70 is housed within the motor mount 70, that is not essential, the fan may be external to the motor mount 70.

One purpose of the motor mount 100 is to fit around the fan unit 70 and serve as an isolating interface between the external case of the fan unit 70 and an internal surface of an apparatus into which the fan unit is installed. To enhance the isolating characteristics of the motor mount 100, the sleeve 112 is provided with a noise attenuating means. In this embodiment, the noise attenuating means takes the form of a plurality of projecting elements 132, 134 that are spaced around an outer surface 130 of the motor mount. Note that only a few of the elements are labelled for clarity.

More specifically, a first type of elements are studs 132 formed as right circular cones, each of which defines a sharp point, also referred to as a vertex 136, that are directed away from the sleeve 112. The studs 132 therefore provide sharp points distributed radially about the surface of the sleeve 112 to serve as an interface with an adjacent housing into which the fan unit 70 and motor mount 100 is installed. FIG. 6 shows the motor mount 100 installed in a casing or housing 150 which forms a part of an inner wall 220 of the handle 20.

A second type of elements is a plurality of compression ribs 134, these are spaced radially around the motor mount 100. A first set of compression ribs 134*a* are located between a flange 124*a* and the first end 114 around an outer surface 130 of the motor mount 100. A second set of the compression ribs 134*b* are located between a flange 124*b* and the second end 116 of the sleeve 112 and around the inner surface 122 of the motor mount. Thus, the compression ribs 134 are located axially external to or out with the chamber 118 in which the fan unit 70 is located. The compression ribs 134 provide axial cushioning for the fan unit 70.

The casing 150 includes a pair of annular seats 160 which each extend radially inwards of the inner wall 220 and which define the location of the motor mount 100 within the casing 150. Each annular seat 160 engages with a respective end 114, 116 of the motor mount 100 and retains the motor mount 100 within the casing or housing 150. Each annular seat 160 is provided with a flange 162 which extends radially inwards of the casing 150 and inner wall 220 and is adapted to engage with an end 114, 116 of the motor mount 100. The second end 116 of the motor mount 100 is the downstream end or the end that is furthest from the primary fluid inlet 40 and the bellow seal 140 at the second end 116 engages with the flange 162*a* in a sealing engagement which prevents fluid flowing around the outside of the motor 70.

At the second end 116 of the motor mount 100, an annular seal 140 is provided. The annular seal 140 is a bellow seal which has a number of functions, one of which is to provide a seal between the casing 150 and the motor mount 100, another is to house the compression ribs 134 and a third is to isolate vibration. The bellow seal 140 is a self-energizing seal and when the fan unit 70 is activated the sealing surface 142 of the bellow seal 140 is pushed against the contacting surface 162*a* of flange 160.

At the first end 114 of the motor mount 100, an annular seal is not provided; the motor mount is non-continuous around a plane that defines the first end 114 of the motor mount 100. The end surface 214 is shaped in a zig zag pattern or an undulating pattern. The pattern is a regular pattern having a single frequency of zig zags or undulations. This is not essential, but is advantageous as the motor mount 100 is supported evenly around the circumference of the first end 114 so the motor 70 is balanced radially around the motor mount 100.

The zig zags or undulations of the end surface 214 produce a number of projections 216 which extend along the longitudinal axis Y-Y of the sleeve 112 and towards the primary fluid inlet 40. Each of these projections 216 includes a compression rib 134*a*.

A second flange 162*b* is provided at the upstream end of the casing 150 or the end that is nearest the primary fluid inlet 40 and this engages with the projections 216 of the end surface 214 at the first end 114 of the motor mount 100. As there is not a continuous planar surface at the first end 114 of the motor mount 100, this surface does not provide a seal against fluid flowing around the periphery of the motor 70 and the motor mount 100. This seal is instead provided by a lip seal 144 which extends radially around an outer surface 130 of the motor mount 100.

The lip seal 144 is provided near the first end 114 and radially spaced from the end surface 214 however, the lip seal 144 may be positioned at any position along the sleeve 112.

When the motor 70 is activated, the pressure produced causes the motor 70 to press down on the first end 114 of the motor mount 100. In earlier versions of the motor mount, the first end had comprised a seal such as the annular seal or bellow seal provided at the second end 116 of this motor mount 100 but if was found that vibration/noise was transmitted axially through this annular seal. By separating two of the functions of the motor mount, this axial transmission of vibration/noise was reduced. The sealing function has been moved to a separate lip seal 144 and the impact cushioning for the motor 70 is still provided by the compression ribs 134*a*. As the compression ribs 134*a* are housed within the projections 216 provided by the undulating end surface 214 a resilient or spring like function is additionally provided which enhances the cushioning effect if, for example the appliance is dropped from a height.

The fact that the contacting surface 162*a*, 162*b* is a radially disposed surface rather than an axially disposed surface improves vibration isolation. The contacting surfaces 162*a*, 162*b* are annular seats located within the main body section 150 formed from flanges 160. On the motor mount 100, flanges 124*a*, 124*b* extend radially inwardly from the inner surface 122 of the motor mount 100 so that the contacting surface 162*a*, 162*b* of each flange 160 of the casing 150 are substantially orthogonal to the rotational axis of the impeller of the fan unit 120. In addition, the rotational axis of the impeller of the fan unit 70 is substantially co-linear with the longitudinal axis of the casing 150.

The bellow seals 140 and the projecting elements 132, 134 provide a plurality of resilient supports between the motor mount 100 and the inner surface 152 of the casing 150. The resilient supports are provided radially about the motor mount 100 and at or adjacent each end 114, 116 of the motor mount providing axial and radial cushioning for the motor regardless of orientation. This is an important benefit of this type of motor mount 100 as for appliances which are designed to be held and do not have a base surface onto which it is placed when not being held the fan unit requires protection from shocks in all orientations is case of dropping the appliance or knocking it off a surface.

In the hairdryer shown in FIGS. 1 and 2, the two heaviest components are the fan unit 70 and the heater 80, thus if the hairdryer 10 falls it will tend to land on the body 30 first. In order to provide extra protection against the motor frame 270 and fan unit 70 being displaced from the casing 150, a recess 170 is provided around the motor mount 100. The recess 170 is an indentation that extends circumferentially around the sleeve 112. The recess 170 is provided near a downstream end of the motor mount 100.

As has been mentioned above, it is preferred that the motor mount is a flexible material polymeric material. In this embodiment, polyurethane rubber is used.

Some variations to the specific embodiment of the illustrative drawings have already been mentioned above. Others will now be explained below.

In the specific embodiment shown the fan unit 70 is equipped with a motor and an impeller to act as a fluid mover, the air flow being depict by way of arrows and both the motor and impeller are housed within the motor mount. Such an arrangement may have particular application to other devices which require high speed air flows, such as vacuum cleaners; other hair care appliances such as traditional hairdryers having fluid flowing through just the body and hot styling brushes; and fans. However, it should be appreciated that the specific embodiment is only exemplary and that the motor mount may house just the motor with the impeller being located externally thereof hence the use of the term motor mount 100 as the mount is applicable to any apparatus in which a motor needs to be installed in a close conforming housing, whether or not the motor is coupled to an impeller.

The cylindrical shape of the sleeve is currently preferred since it functions to envelope the correspondingly shaped outer surface of the motor in an unbroken 'sock' of protecting and isolating material. However, it is also envisaged that benefits would be achieved if the sleeve were part cylindrical so that it does not envelope the entire outer surface of the motor.

Although the outer surface of the motor mount is provided with a plurality of pointed studs, in this embodiment, the inner surface of the motor mount is smooth. Reference to the smoothness of the internal surface of the sleeve is not intended as a precise value of surface roughness, rather that the inner surface should be substantially free from surface aberrations/bumps and projections, so that the inner surface makes uniform contact with the outer periphery of the external case of the motor. Without being bound by theory, it is believed that the smoothness of the inner surface of the sleeve promotes good acoustic contact between the motor and the sleeve.

In the specific embodiment described above the sleeve is cylindrical. However, it should be appreciated that this is not essential to the invention and the sleeve may instead have a different cross sectional profile. Here, the profile is cylindrical so as to match the cylindrical profile of the motor casing since the sleeve should conform to its outer surface. It follows, therefore that the sleeve may have whatever profile is required to mate with an outer casing of a motor, although cylindrical motor casings are most common.

The annular seal described in the specific embodiments is a bellow seal however any arrangement which is capable of both sealing an annulus and is reversibly compressible is applicable as will be apparent to the skilled person.

The invention claimed is:

1. A motor mount, the mount comprising a sleeve for receiving a motor, the sleeve comprising a longitudinal axis extending between a first end and a second end, wherein the first end comprises a plurality of projections and the plurality of projections project from the first end of the sleeve along the longitudinal axis.

2. The mount of claim 1, wherein the sleeve receives the motor via the first end or the second end.

3. The mount of claim 1, wherein the plurality of projections are spaced around a circumference of the sleeve.

4. The mount of claim 1, wherein the plurality of projections comprises a pattern of constant frequency around the sleeve.

5. The mount of claim 1, wherein the plurality of projections are substantially V-shaped with a point extending along the longitudinal axis from the first end of the sleeve.

6. The mount for a motor of claim 1, wherein a radial seal is provided and the radial seal extends around a circumference of the sleeve.

7. The mount of claim 6, wherein the radial seal is a lip seal.

8. The mount of claim 6, wherein the radial seal is positioned near the first end of the sleeve.

9. The mount of claim 1, wherein the first end comprises a plurality of compression ribs.

10. The mount of claim 9, wherein each one of the plurality of compression ribs is housed within one of the plurality of projections.

11. The mount of claim 1, wherein the second end comprises a plurality of compression ribs.

12. The mount of claim 1, wherein a second seal is provided near the second end of the sleeve.

13. The mount of claim 12, wherein the second seal is a bellow seal.

14. The mount of claim 13, wherein the bellow seal houses a plurality of compression ribs.

15. A hair care appliance comprising:
a casing having a fluid inlet, a fluid outlet and an annular seat; and
a motor mount comprising: a sleeve for receiving a motor, the sleeve comprising a longitudinal axis extending between a first end and a second end, wherein the first end comprises a plurality of projections and the plurality of projections project from the first end of the sleeve along the longitudinal axis, wherein the first end of the mount is supported by the annular seat.

16. A hair care appliance comprising:
a casing having a fluid inlet, a fluid outlet and an annular seat;
a motor mount supported by the annular seat, the motor mount comprising: a sleeve for receiving a motor the sleeve having a longitudinal axis extending between a first end and a second end, wherein the first end comprises a plurality of projections, the plurality of projections project from the first end of the sleeve along the longitudinal axis, and the plurality of projections engages with the annular seat.

17. The appliance of claim 16, wherein the appliance comprises a body which houses a heater and a handle which includes the casing.

18. The appliance of claim 17, wherein the appliance comprises a fluid flow path extending from a fluid inlet into the casing to a fluid outlet in the body.

19. The appliance of claim 16, wherein the first end is provided at a downstream end of the motor mount.

* * * * *